Patented Apr. 30, 1946

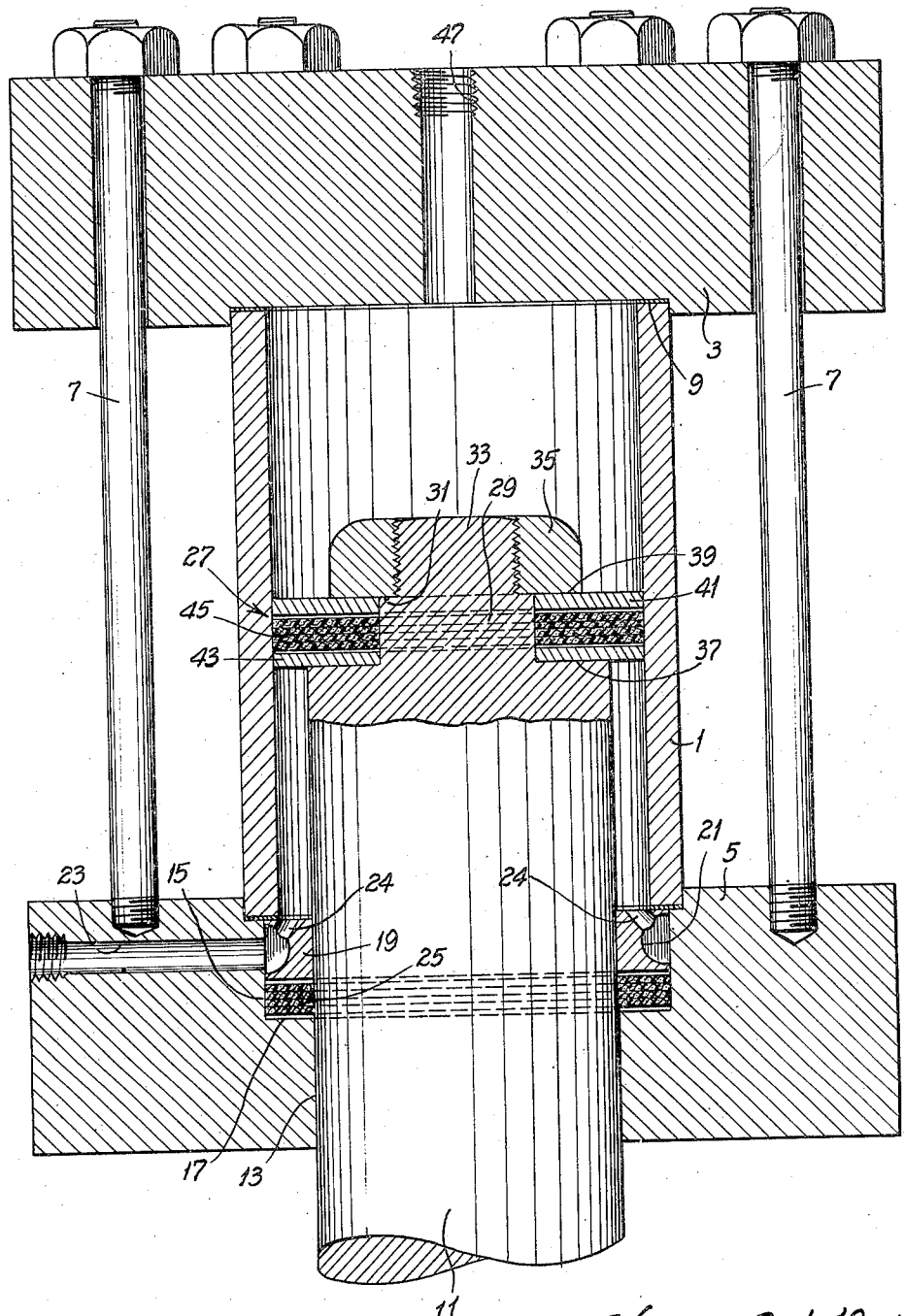

2,399,550

UNITED STATES PATENT OFFICE 2,399,550

PACKING

Victor G. Klein, St. Louis, Mo., assignor to Lincoln Engineering Company, St. Louis, Mo., a corporation of Missouri Application August 16, 1944, Serial No. 549,645

1 Claim. (Cl. 286—31)

This invention relates to packing, and with regard to certain more specific features, to packing for reciprocating parts under high pressures.

Among the several objects of the invention may be noted the provision of a simpler, more effective and reliable, long-wearing packing for high pressures; the provision of a packing of the class described which effects a more positive initial seal with low frictional resistance and which builds up less frictional resistance than heretofore under increased pressures; and the provision of packing of this class which will maintain its effective principles of operation over long periods of time under adverse conditions. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawing, in which is illustrated one of various possible embodiments of the invention, the single figure is a longitudinal section showing the two forms of the invention used in an exemplary hydraulic press structure.

Similar reference characters indicated corresponding parts in the drawing.

Referring now more particularly to the drawing, the reciprocating power elements of a high-pressure hydraulic press are shown, in which numeral 1 is the cylinder held by means of draw studs 7 between heads 3 and 5. Suitable gaskets are used at 9. These gaskets are not the subject of the present invention. At numeral 11 is shown the piston rod which slides through an opening 13 in the head 5. This opening is counterbored from the cylinder end as shown at 15, the counterbore being cylindric with a flat seat 17.

At numeral 19 is shown a distributor ring through which slides the piston rod 11. Ring 19 is exteriorly grooved as shown in 21 and connected with the inside of the cylinder 1 by a plurality of peripherally spaced passages 24. This ring 19 serves to distribute fluid which passes in and out of an opening 23.

The packing members in the counterbore 15 comprise a plurality of flat separate wafer-like annular rings or discs 25, each preferably composed of a resilient material such as synthetic rubber which will resist attack from the hydraulic fluid used, such as for example oil. A particularly good material for the purpose is a woven fabric embedded in synthetic rubber. The fabric acts as a reinforcement for the resilient material. Each ring also has an inside diameter which before application to the rod 11 is slightly smaller than the rod. Each ring also has an outside diameter which before application into the counterbore 15 is slightly larger than the diameter of said counterbore. The result is that all closely hug the rod 11 and on their outside diameters they closely hug the counterbore 15. This factor provides a desired initial seal against leakage, despite initial relatively low starting friction. It will be noted also that the axial thickness of each ring is substantially less than its radial width, thereby rendering it slightly unstable to the stresses involved in the stated hugging action. The result is that each ring when inserted warps slightly out of a true plane. This is under conditions of little or no applied axial pressure. When the axial liquid pressure is applied the rings 25 crowd into a substantially flat condition against their backing which according to the applied pressure increases the radial hugging and sealing action. No attempt has been made to show the warp in the drawing, because of its small (though effective) amount. As the rings flatten out, they tend also to flow or squeeze out radially, thus with increase of liquid pressure, increasing the radial sealing pressure.

Exemplary dimensions are as follows: four laminated rings may be used, each one-eighth of an inch thick. For a five inch diameter or rod 11 the inside diameter of each ring is 4.980 inches. For an inside diameter of the counterbore 15 of 6½ inches, each ring has an initial outside diameter of 6.540 inches. The total axial clearance before compression between the aggregate of the ring thicknesses and the axial space between ring 19 and seat 17 is from .030 to .060 inch.

Thus under the conditions, as determined by the above exemplary dimensions each ring when assembled in position, before application of hydraulic pressure, will be slightly deformed from a perfectly plane condition. This is due to the stresses brought about by straining the rings when they are inserted. The result is the stated original grip both inside and outside of the ring for preventing initial leakage under low pressure. Then when pressure builds up as by introducing pressure to the opening 23 (and behind a piston to be described) the packing rings 25 are crowded together. Since these are then flattened from their initially slightly distorted shapes, and since they tend to build up radial pressures against the shaft 11 and within the counterbore 15, they increasingly resist leakage under increasing pressure.

The piston above alluded to is shown in general at numeral 27 and is carried upon a stub-end 29 of shaft 11. This stub-end 29 has a reducing shoulder 31 from which extends threaded end 33 for a nut 35. The stub-end 29 in connection with the main diameter of the shaft 11 forms a shoulder 37. Between the inner-face 39 of nut 35 and the shoulder 37 are positioned two floating metal rings or washers 41 and 43. Between these are located a plurality of packing rings or discs 45 built upon principles described in connection with discs 25. For example, these discs also are each ⅛ of an inch in thickness. Assuming the stub-end 29 to be 2½ inches in diameter, the inside diameters of these discs are 2.480 inches. Assuming the inside diameter of the cylinder to be 6 inches, the outside diameters of the discs 45 are 6.040 inches. The total axial clearance between the sum of the axial dimensions of discs 41, 43 and 45, and the space between spaces 37 and 39 is from .030 to .060 inch. The material of the discs 45 corresponds to that of the rings 25. The action of the discs 45 both before pressure is applied and after pressure is applied is similar to that of the discs 25. When pressure is released through port 23 and pressure is introduced through a port 47 the clearance is taken up by ring 41 crowding the discs together. They increase in radial pressure with increase in axial pressure. When the piston is backed off by pressure from port 23 and release of pressure in port 47, the discs 45 are crowded by pressure to their high-pressure sealing condition.

The invention has several advantages over the ordinary hydraulic packings. For example, in the case of more complex, so-called elevator packing, which is made up with a hat-shaped section or a U-shaped section with feathered sealing lips, is quite critical to scoring. The present invention is also advantageous over those forms of packing employing a gland with a pressure member which is drawn up to squeeze the packing initially. With such packing means, unless extreme care is used in adjusting the gland, the initial tension may become excessive resulting in binding.

The value of the multiple laminated character of the packing is that the reduction in leakage for each added lamination is greater than the reciprocal of the number of rings. For example, the leakage past a two-disc packing is less than half of the leakage which passes a single ring packing.

It is also to be noted that the thin axial characteristic of each disc is of importance. That is to say, the axial thickness is relatively small with respect to the radial width of each lamination so that initial distortions are caused by the initial tension, but this may be flattened out by the applied pressure. The minimum ratio for each ring is about one to three of axial thickness as compared to radial width. Another controlling factor in the choice of this ratio is that when the axial thickness is near to or equal to the radial width (or greater) it is (1) difficult to punch out the ring-forming annulus and (2) it is difficult to maintain the tolerances which will bring about the initial tension for a proper initial seal. Even when the width is greater than the thickness but less than three to one, difficulty is met within maintaining the necessary tolerances to obtain the initial tension desired. Also, with rings that are radially too narrow, their girthwise tensile strength becomes small so that they do not permanently set up a sufficient initial tension against the adjacent surfaces of the male and female cylindric elements on and in which they are located.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

Packing means for use between relatively reciprocating male and female cylindric members comprising laminations of resilient packing material each lamination being an annular disc and of an axial thickness considerably less than its radial width, said laminations having normal free inside diameters slightly smaller than the diameter of the part on which they are located and having normal outside diameters slightly larger than the part within which they are located, whereby said laminations when in packing position are tensioned by said parts and are in the absence of axial pressure stressed and warped slightly into peripheral undulations, means providing a flat disc-like annular confining space so confining said deformed discs that each one in undulated condition remains essentially in a flat plane location in the absence of applied axial pressure, said discs under axial pressure being crowded together to reduce the warp and tending under resulting further stress to expand radially against the relatively movable male and female parts, said confining space substantially preventing the discs under reciprocation from deviating from their flat plane locations towards conical locations.

VICTOR G. KLEIN.